(12) United States Patent
Okada

(10) Patent No.: US 8,259,223 B2
(45) Date of Patent: Sep. 4, 2012

(54) IMAGING MODULE

(75) Inventor: Hiroshi Okada, Setagaya-ku (JP)

(73) Assignee: Kyocera Corporation, Kyoto (JP)

( * ) Notice: Subject to any disclaimer, the term of this patent is extended or adjusted under 35 U.S.C. 154(b) by 174 days.

(21) Appl. No.: 12/934,260

(22) PCT Filed: Mar. 3, 2009

(86) PCT No.: PCT/JP2009/053971
§ 371 (c)(1),
(2), (4) Date: Sep. 23, 2010

(87) PCT Pub. No.: WO2009/119260
PCT Pub. Date: Oct. 1, 2009

(65) Prior Publication Data
US 2011/0013077 A1    Jan. 20, 2011

(30) Foreign Application Priority Data

Mar. 26, 2008 (JP) ................................. 2008-080818

(51) Int. Cl.
*H04N 5/225* (2006.01)
(52) U.S. Cl. ...................................... 348/373; 396/535
(58) Field of Classification Search ................. 396/533, 396/373, 374
See application file for complete search history.

(56) References Cited

U.S. PATENT DOCUMENTS

| | | | |
|---|---|---|---|
| 5,221,964 A * | 6/1993 | Chamberlain et al. | 348/373 |
| 5,731,834 A * | 3/1998 | Huot et al. | 348/374 |
| 6,351,288 B1 * | 2/2002 | Johnson et al. | 348/373 |
| 7,388,192 B2 * | 6/2008 | Chang et al. | 250/239 |
| D605,680 S * | 12/2009 | Okada | D16/218 |
| 8,107,801 B2 * | 1/2012 | Shimizu et al. | 392/418 |
| 2005/0248684 A1 * | 11/2005 | Machida | 348/373 |
| 2007/0029466 A1 | 2/2007 | Chang et al. | |
| 2007/0292124 A1 * | 12/2007 | Gottwald et al. | 396/419 |
| 2009/0324213 A1 * | 12/2009 | Wang | 396/529 |
| 2010/0151192 A1 * | 6/2010 | Saito | 428/137 |
| 2012/0033956 A1 * | 2/2012 | Chen | 396/89 |

FOREIGN PATENT DOCUMENTS

| | | |
|---|---|---|
| JP | 2004-272196 | 9/2004 |
| JP | 2005-094637 | 4/2005 |
| JP | 2007-116510 | 5/2007 |

OTHER PUBLICATIONS

Chinese language office action dated Feb. 16, 2012 and its English language translation issued in corresponding Chinese application 200980110539 cites the U.S. patent application publication above.

* cited by examiner

*Primary Examiner* — Jason Chan
*Assistant Examiner* — Abdelaaziz Tissire
(74) *Attorney, Agent, or Firm* — DLA Piper LLP (US)

(57) ABSTRACT

An imaging module includes an imaging substrate mounting an imaging device thereon, a substrate holding plate, a holder. The substrate holding plate includes four substrate securing portions for securing the imaging substrate that are located opposing to four corners of the imaging substrate, respectively, an opening portion surrounded by the four substrate securing portions, and four holder securing portions that are located outwardly from the four substrate securing portions in a longitudinal direction thereof, respectively. The holder is formed integrally with a lens support barrel configured to support a lens unit at an inside thereof, and has plate securing portions configured to secure the holder securing portions at positions opposed to the holder securing portions of the substrate holding plate, respectively. The imaging module causes little residual compressive stress left in the imaging substrate, so that it can acquire high-resolution images.

5 Claims, 2 Drawing Sheets

IMAGING MODULE

CROSS-REFERENCE TO THE RELATED APPLICATIONS

This application is a national stage of international application No. PCT/JP2009/053971, filed on Mar. 3, 2009 and claims the benefit of priority under 35 USC 119 to Japanese Patent Application No. 2008-080818, filed on Mar. 26, 2008, the entire contents of which are incorporated herein by reference.

TECHNICAL FIELD

The present invention relates to an imaging module which employs an imaging device such as a semiconductor image sensor.

BACKGROUND ART

For example, in Patent literature 1, there is disclosed, as a compact imaging module, an imaging module which employs a semiconductor image sensor such as a CCD image sensor and a CMOS image sensor as an imaging device for converting light from a subject into an electric signal, and comprises an imaging substrate having the imaging device mounted thereon and a holder provided with a lens support barrel configured to support a lens for condensing subject light.

Moreover, in the imaging module described in Patent literature 1, the imaging substrate and the holder are fastened to each other by screws. More specifically, a through hole for screw insertion is formed in the imaging substrate, and a screw retaining hole is formed in the holder. A screw is inserted into the through hole of the imaging substrate from a side opposite the side of a subject, and is subsequently put in the screw retaining hole of the holder, so that the imaging substrate can be clamped by the holder and the head of the screw to be fastened to the holder.

It is noted that a printed circuit substrate made of a resin material such as epoxy resin capable of withstanding screw-fastening operation is used as the imaging substrate.

CITATION LIST

Patent literature 1: Japanese Unexamined Patent Publication JP-A 2004-272196

DISCLOSURE OF INVENTION

Technical Problem

In effecting fixation between the imaging substrate and the holder as described above, when the screw is tightened up, the imaging substrate is generally subjected to a stress tending to extend it in a direction parallel to its main surface. On the other hand, the holder is not clamped by the screw and is thus free from generation of such a stress. Therefore, the stress causing an extension of the imaging substrate is affected by a reaction force at a part of screw-fixation, with consequent generation of a compressive stress on the imaging substrate. This gives rise to a problem of development of warpage in the imaging substrate. If the distance between the imaging device and the lens is adjusted under these circumstances, the following problem will arise. Since the compressive stress remains on the imaging substrate, upon the residual compressive stress becoming extinct due to the thermal expansion of the holder or the like resulting for example from a change in ambient temperature during long-term use of the imaging module, the warpage of the imaging substrate is lessened. This results in a change in the distance between the imaging device and the lens.

That is, in the conventional imaging module, since the distance between the lens and the imaging device is likely to vary during long-term use, it follows that subject light goes out of focus. This makes it difficult to obtain high-resolution images.

The invention has been devised to solve the problems associated with the conventional art, and accordingly its object is to provide an imaging module that is enabled to acquire high-resolution images by lessening deformation of an imaging substrate having an imaging device mounted thereon.

Solution to Problem

The invention provides an imaging module, comprising:
a rectangular imaging substrate configured to mount an imaging device for converting light from a subject into an electric signal;
a substrate holding plate made of a rectangular platy material, one main surface thereof opposing to one main surface of the imaging substrate on which is mounted the imaging device, comprising:
  four substrate securing portions for securing the imaging substrate that are located opposing to four corners of the imaging substrate, respectively,
  an opening portion surrounded by the four substrate securing portions, and
  four holder securing portions that are located outwardly from the four substrate securing portions in a longitudinal direction of the substrate holding plate, respectively;
a lens support barrel configured to support a lens for condensing subject light into the imaging device at an inside thereof; and
a holder, which is formed integrally with the lens support barrel and opposes the other main surface of the substrate holding plate, comprising four plate securing portions configured to secure the four holder securing portions at positions opposed to the four holder securing portions of the substrate holding plate, respectively.

Moreover, in the imaging module of the invention, it is preferable that the opening portion includes a region between two of the four substrate securing portions opposed to each other in the longitudinal direction of the imaging substrate.

Moreover, in the imaging module of the invention, it is preferable that the imaging device is inside a space constituted by the imaging substrate, the opening portion of the substrate holding plate and the holder.

Advantageous Effects of Invention

According to the imaging module of the invention, it employs the substrate holding plate comprising the four substrate securing portions for securing the imaging substrate that are located opposing to the four corners of the imaging substrate, respectively, and the opening portion surrounded by the four substrate securing portions. In this construction, when the imaging substrate is about to extend under a stress applied to each of the substrate securing portions at the time of fixing the imaging substrate to the substrate holding plate, the substrate holding plate is caused to extend in response to the extension of the imaging substrate because of the provision of the opening portion. This makes it possible to reduce a reaction force that the imaging substrate receives from the four substrate securing portions and thereby reduce a resultant compressive stress. Moreover, the four holder securing portions formed in the substrate holding plate, which secure the holder formed integrally with the lens support barrel, are located outwardly from their respective four substrate securing portions in the longitudinal direction. Therefore, by securing the substrate holding plate to the holder, the substrate holding plate is caused to extend in such a way as to lessen a residual stress entailed by the extension of the imaging substrate. This helps reduce a compressive stress remaining on the imaging substrate. That is, according to the imaging module of the invention, the compressive stress remaining on the imaging substrate is so small that, even if the holder undergoes thermal expansion due to for example a change in ambient temperature, the imaging substrate bearing the imaging device thereon becomes deformed little. This makes it possible to reduce variation in the distance between the lens and the imaging device and variation in the angle between the direction in which light is condensed by the lens and the imaging device, and thereby obtain high-resolution images in spite of long-term use.

Moreover, according to the imaging module of the invention, the opening portion includes the region between two of the four substrate securing portions opposed to each other in the longitudinal direction of the imaging substrate. In this case, the substrate holding plate can be extended more readily, with consequent further reduction in the compressive stress remaining on the imaging substrate. This makes it possible to obtain images of higher resolution in spite of long-term use.

Moreover, according to the imaging module of the invention, the imaging device is inside a space constituted by the imaging substrate, the opening portion of the substrate holding plate and the holder. In this case, there is no need to prepare an additional protective member for the protection of the imaging device, with consequent miniaturization of the imaging module.

DESCRIPTION OF EMBODIMENTS

Hereinafter, an imaging module of the invention will be described in detail with reference to the accompanying drawings. It is noted that, in the following description, the side of the imaging module opposite a subject will be referred to as the "back side".

Figure 1:
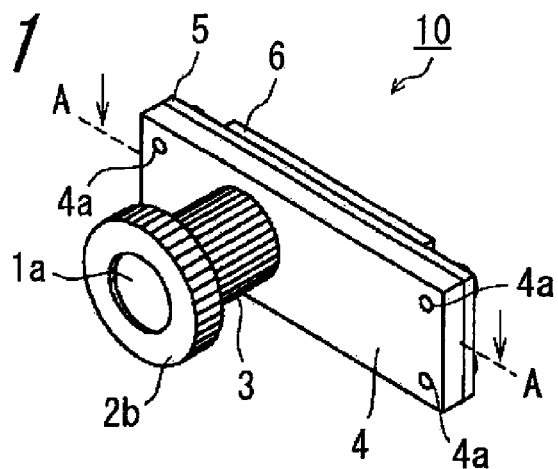
FIG. 1 is an external perspective view of a camera module which is an example of embodiments of the imaging module of the invention, as seen from a subject.
Figure 2:
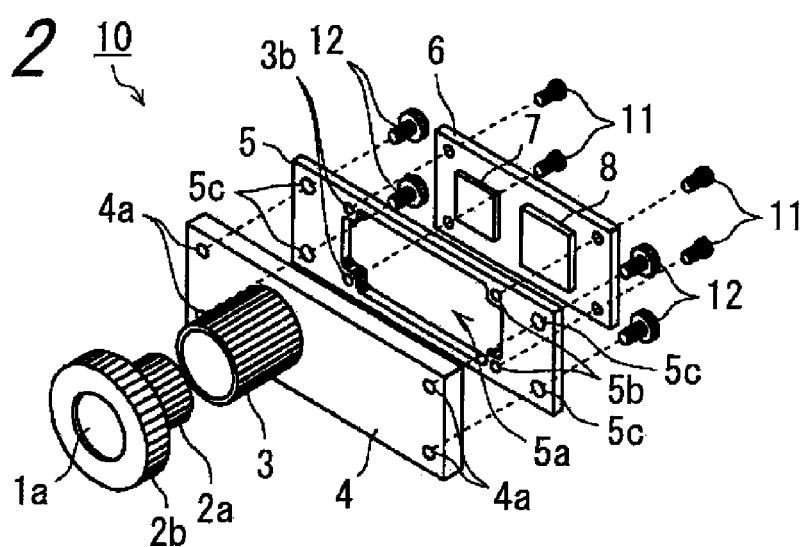
FIG. 2 is an exploded perspective view of the camera module shown in FIG. 1.
Figure 3:
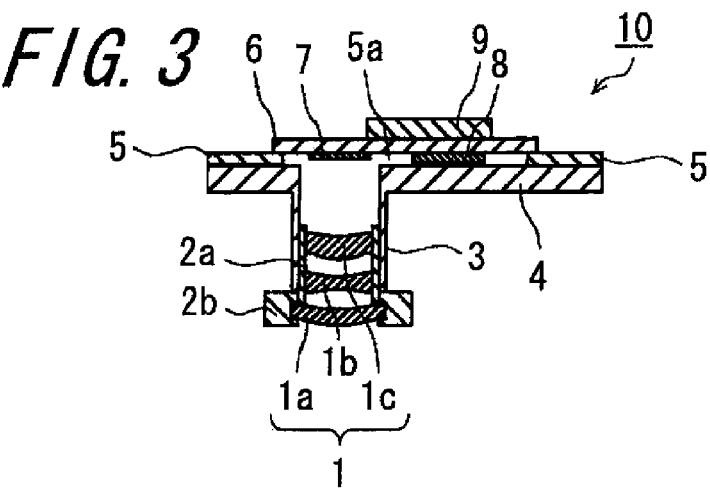
FIG. 3 is a sectional view of the camera module taken along the line A-A depicted in FIG. 1.

FIG. 1 is an external perspective view of a camera module which is an example of embodiments of the imaging module of the invention, as seen from a subject. FIG. 2 is an exploded perspective view of the camera module shown in FIG. 1. FIG. 3 is a sectional view of the camera module taken along the line A-A depicted in FIG. 1. The camera module 10 shown in those figures basically comprises a lens support barrel 3, a holder 4, a substrate holding plate 5, an imaging substrate 6, and so forth.

Such a camera module 10 is designed for use as for example a vehicle-mounted camera module, and has the capability of taking images of white lines on a road or images of blind spots of a driver who drives a vehicle, and is operated under the control of an ECU (Electronic Control Unit) (not shown) for exercising vehicle travel control. It is noted that an electric signal outputted from the camera module 10 is converted into an image signal by the ECU so as to be shown on a display (not shown) placed forward of a driver's seat.

The imaging substrate 2 is a substrate having an imaging device 8 for converting light from a subject into an electric signal mounted on one of the main surfaces thereof (the main surface thereof situated toward a subject). For example, the imaging substrate is constructed of a printed wiring substrate formed by adding a glass filler to epoxy resin, a printed wiring substrate formed by impregnating a glass cloth with epoxy resin, or the like. An example of methods for constructing a printed wiring substrate will be described below.

To begin with, glass fibers made of alkali-free glass, quartz glass, or the like are woven into a glass cloth with the aid of an agent added with a resin-made binder, such as a sizing agent or a bundling agent, for protection of the glass fibers.

Next, the glass cloth is subjected to a water-washing treatment or heating treatment to remove the binder therefrom.

Next, as a coupling treatment to impart wettability and adherability with resin to the surface of the glass cloth, the binder-free glass cloth is immersed in a solution containing a silane coupling agent or the like and is whereafter dried.

Next, the coupling-treated glass cloth is impregnated with thermosetting resin to form a prepreg as an insulating layer.

Next, the surface of the prepreg formed as an insulating layer is coated with copper foil and is subjected to etching to form a wiring conductor in a predetermined pattern.

Next, a plurality of the prepregs formed with the wiring conductor are stacked and bonded together under pressure, with an adhesive made of thermosetting resin interposed therebetween, and the thermosetting resin is cured with heat. In this way, there is formed a multilayer substrate comprising a stack of a plurality of alternate insulating layers and wiring conductors.

Next, a through hole is formed by a drill so as to pass all the way through from the obverse side to the reverse side of the multilayer substrate.

After that, the inner surface of the through hole is plated with copper to form a through hole conductor for providing electrical connection between an upper-located wiring conductor and a lower-located wiring conductor. In this way, a printed wiring substrate is fabricated.

The imaging device 7 mounted on the imaging substrate 6 is constructed by placing a semiconductor image sensor such as a CCD image sensor or a CMOS image sensor in a semiconductor package. The semiconductor package is a highly airtight packaging member such for example as a ceramic wiring substrate composed predominantly of alumina. The semiconductor image sensor is housed in a cavity (not shown) formed at a subject-side part of the semiconductor package. It is noted that the cavity is sealed with a light-transmissible lid (not shown) made of glass or the like material. Moreover, plurality of terminals (not shown) extend from a lateral surface or a lower surface of the semiconductor package. The imaging device 7 is designed to be electrically connected, through those terminals, to the imaging substrate 6 and fixed in place by means of a coupling material such as solder. It is preferable that the amounts of the glass cloth and the glass filler used for the imaging substrate 6 are so determined that the thermal expansion coefficient of the semiconductor package can be equal to the thermal expansion coefficient of the imaging substrate 6 in order to reduce a thermal stress developed between the imaging substrate and the semiconductor package.

Moreover, on the surface and in the interior of the imaging substrate 6, there are formed a ground line for earthing (not shown) and a wiring conductor (not shown) which permits electrical connection with the terminals of the semiconductor package and the terminals of another mounted component, or to which are fixed those terminals. Such wiring conductor and ground line are formed on the surface and in the interior of the printed wiring substrate constituting the imaging substrate 6 by means of a plating technique when using a metal such as copper and gold as a material for the wiring conductor and ground line, a technique of bonding metal foil formed in a predetermined wiring pattern, a technique of removing unnecessary portions from the substrate wholly coated with metal foil by etching, or otherwise.

Such an imaging substrate 6 is fabricated as follows. For example, there is prepared a commercially available copper-coated substrate which is a substrate whose obverse and reverse surfaces are entirely covered with copper foil. This substrate is cut in desired dimensions, and the copper foil laminated on the surface thereof is etched in a desired wiring pattern with use of an acidic solution such as a diluted sulfuric acid solution. It is noted that a through hole may be made therein by means of a laser, a drill, or otherwise on an as needed basis. By charging a metal paste into this through hole, it is possible to form a through conductor in a buried state and thereby provide electrical connection between the wiring pattern on the obverse side and the wiring pattern on the reverse side of the substrate.

On the other main surface of the imaging substrate 6 at the back side, expressed differently, on the main surface of the imaging substrate 6 opposite the surface thereof where the imaging device 7 is disposed, there are mounted components including an IC 8 for processing electric signals from the imaging device 7 and a connector 9 for connecting a distributing cable (not shown) for providing electrical connection between the wiring conductor of the imaging substrate 6 and the ECU (not shown).

A lens unit 1 for condensing subject light in the imaging device 7 is generally designed as a group of a plurality of lenses, namely a first lens 1a whose subject-side part is convexly curved for gathering subject light at wide angles, and a second lens 1b and a third lens 1c for causing the light that passed through the first lens 1a to approximate a parallel ray of light. When the lens unit 1 is composed of the foregoing three lenses, for example, the first lens 1a, the second lens 1b, and the third lens 1c are arranged, in the order presented from the subject side toward the imaging device 7, so as to be in overlying relation with each other on the optical axis.

The lens unit 1 is pressed, from the subject side, against a stepped portion formed on an inner wall in the inner space of a lens barrel 2a and is fixed in place by a retainer 2b acting as a pressing jig. For example, the retainer 2b and the lens barrel 2a are formed by processing a platy member made of anodized aluminum with use of a mold under application of heat.

Moreover, the lens barrel 2a has, over its outer wall, thread grooves that engage with thread grooves formed over the inner wall of the interior of the lens support barrel 3, so that the lens barrel 2a can be freely movable on the optical axis relative to the lens support barrel 3. Thus, in the camera module 10 of this example, the lens unit 1 is supported indirectly on the interior of the lens support barrel 3, with the lens barrel 2a lying therebetween.

The lens support barrel 3 is, at its back-side part, fitted integrally with the holder 4. The holder 4 acts to hold the imaging substrate 6, with the substrate holding plate 5, which will hereinafter be described, lying therebetween. For example, the holder 4 can be fabricated as an aluminum casting by injecting molten aluminum into a mold conforming to the shape of the holder 4 in a state of being formed integrally with the lens support barrel 3. Instead of aluminum, a metal material such as stainless steel can be used as the material for the lens support barrel 3 as well as the holder 4.

Figure 4:
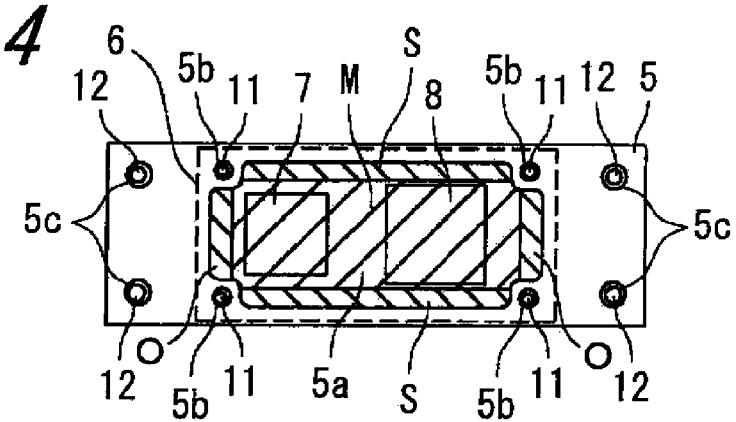
FIG. 4 is a see-through plan view showing the camera module shown in FIG. 1 with the holder removed as seen from a subject.

FIG. 4 is a see-through plan view showing the camera module 10 shown in FIG. 1 with the holder 4 removed as seen from a subject. As shown in FIG. 4, the substrate holding plate 5 is made of a rectangular plate-shaped material, and one main surface thereof opposes to one main surface of the imaging substrate 6 on which is mounted the imaging device 7. The substrate holding plate 5 comprises four substrate securing portions 5b for securing the imaging substrate 6 that are located opposing to the four corners of the imaging substrate 6, respectively. In the camera module 10 of this example, a through hole is formed in each of the four corners of the imaging substrate 6, and a screw retaining hole is formed in each of the substrate securing portions 5b of the substrate holding plate 5, so that the imaging substrate 6 and the substrate holding plate 5 can be fastened to each other by screws 11. More specifically, the screws 11 are inserted, from the back side, into their respective through holes at the four corners of the imaging substrate 6, and are subsequently put in their respective screw retaining holes at the substrate securing portions 5b of the substrate holding plate 5. Then, the imaging substrate 6 is tightly sandwiched between the substrate holding plate 5 and the heads of the screws 11, whereupon the imaging substrate 6 is fixed to the substrate holding plate 5. For example, just as with the holder 4, the substrate holding plate 5 can be fabricated as a casting with use of a metal material such as aluminum. The screw 11 should preferably be designed to withstand a stress which is exerted thereon at the time of screw-fastening operation, as well as to be rust-resistant. For example, a metal material such as stainless steel is used as the material for the screw 11.

Moreover, in the substrate holding plate 5, a region M surrounded by the four substrate securing portions 5b (indicated by oblique lines extending from the upper right to the lower left of FIG. 4) is opened to form an opening portion 5a. Upon the imaging substrate 6 being secured to the substrate holding plate 5, the imaging device 7 and the IC 8 are located within the region M surrounded by the four substrate securing portions 5b.

In the camera module 10 of this example, the substrate holding plate 5 comprises four holder securing portions 5c that are located outwardly from the four substrate securing portions 5b in a longitudinal direction of the substrate holding plate 5, respectively. On the other hand, the holder 4 opposes the other main surface of the substrate holding plate 5, and comprises four plate securing portions 4a configured to secure the holder securing potions 5c at positions opposed to the holder securing portions 5c of the substrate holding plate 5, respectively.

In the camera module 10 of this example, a through hole is formed in each of the holder securing portions 5c of the substrate holding plate 5, and a screw retaining hole is formed in each of the plate securing portions 4a of the holder 4, so that the substrate holding plate 5 and the holder 4 can be fastened to each other by screws 12. More specifically, the screws 12 are inserted, from the back side, into their respective through holes at the holder securing portions 5c of the substrate holding plate 5, and are subsequently put in their respective screw retaining holes at the plate securing portions 4a of the holder 4. Then, the substrate holding plate 5 is tightly sandwiched between the heads of the screws 12 and the holder 4, whereupon the substrate holding plate 5 is fixed to the holder 4.

The assembly of the camera module 10 of this example can be carried out as follows. At first, the imaging substrate 6 is secured to the main surface of the substrate holding plate 5 on which is located the imaging device 7 by using the screws 11. Next, the other main surface of the substrate holding plate 5 is made to abut fixedly against the back-side main surface of the holder 4 by using the screws 12.

The relative positioning of the lens unit 1 and the imaging device 7 is effected at the time of securing the substrate holding plate 5 to the holder 4. More specifically, at first, the screws 12 are inserted into their respective through holes at the holder securing portions 5c of the substrate holding plate 5, are put in their respective screw retaining holes at the plate securing portions 4a of the holder 4, and are temporarily locked there. Then, the lens barrel 2a supporting the lens unit 1 is inserted into the lens support barrel 3. After that, at the time of letting the subject-side main surface of the substrate holding plate 5 abut fixedly against the back-side main surface of the holder 4, a subject for image adjustment is placed on the subject side, and an adjustment distributing cable is connected to the connector 9. With the adjustment distributing cable connected to an image analyzing apparatus, the holder 4 is moved relative to the imaging device 7 while checking electric signals provided from the imaging device 7 so that the lens unit 1 can be positioned properly. Then, following the completion of re-tightening of the screws 12, the lens barrel 2a is moved relative to the imaging device 7 to adjust the distance between the lens unit 1 and the imaging device 7 properly. It is noted that, by setting the inside diameter of the through hole at the holder securing portion 5c of the substrate holding plate 5 to be larger than normal in consideration for example of positional deviation which could occur when mounting the imaging device 7, it is possible to provide greater latitude in positioning and thereby facilitate positioning operation. Further, following the completion of connection among the holder 4, the substrate holding plate 5, and the imaging substrate 6, the adjustment distributing cable is disconnected from the connector 9.

The camera module 10 of this example employs the substrate holding plate 5 having the four substrate securing portions 5b for securing the imaging substrate 6 that are located opposing to the four corners of the imaging substrate 6, respectively, and the opening portion 5a created by opening the region M surrounded by the four substrate securing portions 5b. In this construction, when the imaging substrate 6 is about to extend under a stress applied to an area around each of the substrate securing portions 5b at the time of fixing the imaging substrate 6 to the substrate holding plate 5, the substrate holding plate 5 is caused to extend in response to the extension of the imaging substrate 6 because of the provision of the opening portion 5a. This makes it possible to reduce the reaction force that the imaging substrate 6 receives from the substrate securing portions 5b and thereby reduce a resultant compressive stress.

In each of the substrate holding plate 5 and the imaging substrate 6, the cross-sectional area of a plane perpendicular to a longitudinal direction of the region M between the corners of the imaging substrate 6 opposed longitudinally to each other is assumed to be X [m$^2$] (as the cross-sectional area of the substrate holding plate 5) as well as to be Y [m$^2$] (as the cross-sectional area of the imaging substrate 6), and also Young's modulus is assumed to be A [Pa] as well as to be B [Pa]. Particularly in this case, when the condition of X×A<Y×B is fulfilled, then the rigidity of the substrate holding plate 5 is found to be low relative to the degree of longitudinal elongation of the imaging substrate 6. That is, since the substrate holding plate 5 is caused to extend in the longitudinal direction of the imaging substrate 6, it is possible to reduce the compressive stress remaining on the imaging substrate 6.

Moreover, the holder securing portions 5c, which are formed in the substrate holding plate 5 to secure the holder 4 formed integrally with the lens support barrel 3, are located outwardly from their respective four substrate securing portions 5b in the longitudinal direction. Therefore, by securing the substrate holding plate 5 to the holder 4, the substrate holding plate 5 can be caused to stretch in such a way as to lessen the residual stress entailed by the extension of the imaging substrate 6 at the time of fastening operation using the screws 12. This helps reduce the compressive stress remaining on the imaging substrate 6.

That is, according to the camera module 10 of this example, the compressive stress remaining on the imaging substrate 6 is so small that, even if the holder 4 undergoes thermal expansion due to for example a change in ambient temperature, the imaging substrate 6 mounting the imaging device 7 becomes deformed little. This makes it possible to reduce variation in the distance between the lens unit 1 and the imaging device 7 and variation in the angle between the direction in which light is condensed by the lens unit 1 and the imaging device 7, and thereby obtain high-resolution images.

Moreover, it is preferable that, when the imaging substrate 6 is attached to the substrate holding plate 5 by putting the screw 11 securely in the substrate securing portion 5b, the screw 11 is threaded through a washer (not shown) so that the screw 11 can be tightened up with its head abutting, through the washer, against the imaging substrate 6. In this case, in contrast to the case where the screw 11 is tightened up with only its head abutting against the imaging substrate 6, it is possible t increase the area of the imaging substrate 6 subjected to a load resulting from the tightening of the screw 11, and thereby reduce a stress developed by the screw-fastening operation. Therefore, a force tending to extend the imaging substrate 6 can be reduced with consequent further reduction in the stress remaining on the imaging substrate 6.

Moreover, according to the camera module 10 of this example, the opening portion 5a includes a region S between the substrate securing portions 5b opposed to each other in the longitudinal direction of the imaging substrate 6. This makes it possible to allow the substrate holding plate 5 to extend more readily and thereby reduce the compressive stress remaining on the imaging substrate 6 even further, with consequent acquisition of images of higher resolution. It is noted that, in the camera module 10 of this example, the opening portion 5a also includes a region O between the substrate securing portions 5b opposed to each other in a direction perpendicular to the longitudinal direction of the imaging substrate 6 as shown in FIG. 4. Although this design does not contribute significantly to the reduction of deformation in the imaging substrate 6, it would be advantageous in reduction of the weight of the substrate holding plate 5.

Moreover, in the camera module 10 of this example, the imaging device 7 is inside a space constituted by the imaging substrate 6, the opening portion 5a of the substrate holding plate 5 and the holder 4. This eliminates the need to prepare an additional protective member for the protection of the imaging device 7, with consequent miniaturization of the camera module 10. In order to achieve such a structure, it is advisable for the substrate holding plate 5 to have a thickness larger than the thickness of, out of the components mounted on the imaging substrate 6 including the imaging device 7 and the IC 8, the one having the largest thickness, or it is advisable to form, on the subject-side main surface of the imaging substrate 6 where the imaging device 7 and the IC 8 are mounted, a recess conforming to the shape of an electronic component having a relatively large thickness, let alone the shape of the imaging device 7 and the IC 8. In this case, the imaging substrate 6 can be made to abut against the substrate holding plate 5 while being pressed onto the back-side main surface thereof in such a manner that the electronic components such as the imaging device 7 and the IC 8 do not interfere with the back-side main surface of the substrate holding plate 5. This makes miniaturization of the camera module 10 possible.

Moreover, by charging an adhesive into a contact part of the imaging substrate 6 and the substrate holding plate 5 and a contact part of the substrate holding plate 5 and the holder 4, the space for accommodating the imaging device 7 can be hermetically sealed more positively than in the case where those members simply abut against each other, with consequent improvement in the reliability of the camera module 10.

It is noted that the charging of an adhesive into the contact part of the imaging substrate 6 and the substrate holding plate 5 means that the contact surface of the imaging substrate 6 and the contact surface of the substrate holding plate 5 adhere to each other closely by an adhesive.

Moreover, in the camera module 10 of this example, it is advisable that an electrode pad (not shown) making connection with the ground line is disposed around the back-side opening of the through hole at each of the four corners of the imaging substrate 6, and the head of the screw 11 is brought into contact with this electrode pad. In this way, since the holder 4 and the substrate holding plate 5 are each made of a metal material, it follows that the ground line of the imaging substrate 6 is electrically connected to the substrate holding plate 5 through the screw 11, and is also electrically connected to the holder 4 through the screw 12. This makes it possible to provide shielding against electromagnetic wave noise from a subject for a group of components mounted on the imaging device 7—bearing surface of the imaging substrate 6, and thereby obtain high-resolution images.

It is to be understood that the application of the invention is not limited to the specific embodiments described heretofore, and that various changes and modifications can be made without departing from the gist of the invention.

For example, as to the camera module 10 thus far described by way of example, the lens unit 1 is described comprising three lenses. However, the lens unit 1 may be composed either of a single lens or of two lenses, and it is also possible to apply to the case where the lens unit 1 is composed of four or more lenses.

Moreover, the imaging substrate 6 does not necessarily have to be so designed that its short side is defined by a perfect straight line. For example, the imaging substrate 6 may be provided with a projection extending outwardly in the longitudinal direction. Also in this case, the same effects as achieved in the camera module 10 can be obtained.

EXAMPLES

The following imaging module pursuant to the invention was fabricated.

To begin with, there was prepared a rectangular imaging substrate 6 which was made of a glass cloth used as a base material and epoxy resin, was 20 mm in vertical dimension, 40 mm in horizontal dimension, and 1.6 mm in thickness, and had through holes formed at the four corners thereof, respectively. Then, an imaging device 7 and an IC 8 were mounted on the front main surface of the imaging substrate 6, and a connector 9 was mounted on the rear main surface thereof.

Next, there was prepared a rectangular substrate holding plate 5 which was made of anodized aluminum and was 20 mm in vertical dimension, 55 mm in horizontal dimension, and 2.5 mm in thickness. The substrate holding plate 5 was subjected to processing in a manner to form a through hole at each of four substrate securing portions 5b and four holder securing portions 5c, and form an opening portion 5a by opening a region M surrounded by the four substrate securing portions 5b.

Next, one of the main surfaces of the substrate holding plate 5 was made to abut against the imaging substrate 6, with the imaging device 7 and the IC 8 lying in the opening portion 5a. Then, stainless steel-made screws 11 were inserted, from the back side, into their respective through holes at the four corners of the imaging substrate 6, and were further put into their respective through holes at the four substrate securing portions 5b. By tightening the screws in this state, the imaging substrate 6 was fastened to the substrate holding plate 5.

Next, there was prepared a rectangular holder 4 which was made of anodized aluminum, was 20 mm in vertical dimension, 55 mm in horizontal dimension, and 4 mm in thickness, and was formed integrally with the back-side part of a 15 mm-diameter lens support barrel 3 having thread grooves formed over the inner wall thereof. The holder 4 was subjected to processing in a manner to form a through hole at each of four plate securing portions 4a.

Next, the other of the main surfaces of the substrate holding plate 5 was made to abut against the back-side surface of the holder 4. Then, stainless steel-made screws 12 were inserted, from the back side, into their respective through holes at the four holder securing portions 5c of the substrate holding plate 5, were put into their respective through holes at the four plate securing portions 4a of the holder 4, and were temporarily locked there.

Next, there was prepared a 13 mm-diameter lens barrel 2a having thread grooves formed over its outer periphery. A lens unit 1 consisting of a group of three lenses was pressed, from the subject side, against a stepped portion formed on the inner wall in the inner space of the lens barrel 2a and was fixed in place by a retainer 2b. The lens barrel 2a was supportably inserted into the lens support barrel 3, with the thread grooves engaging with their respective ones.

Next, the lens barrel 2a supporting the lens unit 1 was inserted into the lens support barrel 3.

Next, the holder 4 was moved relative to the imaging device 7 to position the lens unit 1 properly, and the screws 12 were re-tightened. Then, the lens barrel 2a was moved relative to the imaging device 7 to adjust the distance between the lens unit 1 and the imaging device 7. In this way, there was constructed the camera module 10 as the imaging module of the invention.

A motor vehicle equipped with the camera module 10 as the imaging module of the invention has been driven to run for 30 days while taking images of an area ahead of the motor vehicle as a subject. The result was obtained that no significant change in the accuracy of focus has been observed.

As described heretofore, according to the imaging module of the invention, the substrate holding plate in use is designed to have the opening portion created by opening the region surrounded by the four substrate securing portions opposed to the four corners of the substrate, respectively, and also have the holder securing portions located outwardly from their respective four substrate securing portions in the longitudinal direction. In this construction, a residual compressive stress which remains on the substrate is less likely to be generated.

It has thus been found that the imaging module is capable of acquisition of high-resolution images in spite of long-term use.

REFERENCE SIGNS LIST

1 Lens unit
1a First lens
1b Second lens
1c Third lens
2a Lens barrel
2b Retainer
3 Lens support barrel
4 Holder
4a Plate securing portion
5 Substrate holding plate
5a Opening
5b Substrate securing portion
5c Holder securing portion
6 Imaging substrate
7 Imaging device
8 IC
9 Connector
10 Camera Module (Imaging module)
11, 12 Screw

The invention claimed is:

1. An imaging module, comprising:
a rectangular imaging substrate configured to mount an imaging device for converting light from a subject into an electric signal;
a substrate holding plate made of a rectangular platy material, one main surface thereof opposing to one main surface of the imaging substrate on which is mounted the imaging device, comprising:
four substrate securing portions for securing the imaging substrate that are located opposing to four corners of the imaging substrate, respectively,
an opening portion surrounded by the four substrate securing portions, and
four holder securing portions that are located outwardly from the four substrate securing portions in a longitudinal direction of the substrate holding plate, respectively;
a lens support barrel configured to support a lens for condensing subject light into the imaging device at an inside thereof; and
a holder, which is formed integrally with the lens support barrel and opposes the other main surface of the substrate holding plate, comprising four plate securing portions configured to secure the four holder securing portions at positions opposed to the four holder securing portions of the substrate holding plate, respectively.

2. The imaging module according to claim 1, wherein the opening portion includes a region between two of the four substrate securing portions opposed to each other in the longitudinal direction of the imaging substrate.

3. The imaging module according to claim 1, wherein the imaging device is inside a space constituted by the imaging substrate, the opening portion of the substrate holding plate and the holder.

4. The imaging module according to claim 1, wherein an adhesive is charged into a contact part of the imaging substrate and the substrate holding plate and a contact part of the substrate holding plate and the holder.

5. The imaging module according to claim 1, wherein
the imaging substrate further comprises
through holes formed at four corners thereof, respectively, and
an electrode pad disposed around openings of the through holes on the other main surface thereof on which is not mounted the imaging device, and
the imaging substrate and the substrate holding plate are fastened to each other with screws passing through the through holes and the four substrate securing portions, a part of the screw being kept in contact with the electrode pad.

* * * * *